United States Patent [19]

Stock et al.

[11] 4,425,988

[45] Jan. 17, 1984

[54] INTERMITTENT ROTATIONAL DRIVE

[75] Inventors: David K. Stock; Robert J. Wech, both of Green Bay, Wis.

[73] Assignee: Amplas, Inc., Green Bay, Wis.

[21] Appl. No.: 309,266

[22] Filed: Oct. 7, 1981

[51] Int. Cl.³ .............................................. B60K 41/24
[52] U.S. Cl. ................................ 192/18 R; 192/56 R; 74/125.5
[58] Field of Search ................. 192/18 R, 12 R, 56 R; 74/125.5, 113

[56] References Cited

U.S. PATENT DOCUMENTS

| | | |
|---|---|---|
| 919,006 | 4/1909 | Hancock . |
| 1,476,766 | 12/1923 | Reynolds . |
| 2,253,842 | 8/1941 | Brotman .............................. 74/125.5 |
| 2,475,997 | 7/1949 | Smith ................................... 192/18 R |
| 2,755,687 | 7/1956 | Danly .................................. 192/18 R |
| 2,997,889 | 8/1961 | Schjeldahl et al. . |
| 3,673,879 | 7/1972 | Plare et al. .......................... 74/125.5 |
| 3,889,789 | 6/1975 | Boehringer ....................... 192/56 R |
| 4,282,779 | 8/1981 | Kato .................................... 74/125.5 |

FOREIGN PATENT DOCUMENTS 1025869 of 1966 United Kingdom ............. 192/18 R

Primary Examiner—George H. Krizmanich
Assistant Examiner—Mark Manley
Attorney, Agent, or Firm—James E. Nilles; James R. Custin

[57] ABSTRACT

In a clutch-brake mechanism wherein an input member rotates first in one direction and then in the other, an axially shiftable output member, spline-connected to an output shaft, is clutched to the input member while it rotates in one direction and is declutched and braked while the input member rotates in the opposite direction. The output member has a driven clutch element facing in one axial direction for cooperation with a driving clutch element on the input member and has an oppositely facing braking element cooperating with a relatively stationary braking element which, however, is adjustingly rotatable. All said elements have axially projecting circumferentially spaced teeth for slipless torque transmission. A barrel cam rotating in synchronism with the input member control shifting of the output member through a lever that has a fulcrum, a connection with the output member spaced from the fulcrum, and a cam follower portion engaging the cam. The fulcrum is mounted for movement parallel to the output member axis, but pneumatic cylinders bias it in both directions towards a medial position from which it is displaced during full engagement of the braking elements and the clutching elements. A sensor responsive to fulcrum position can provide for automatic braking in response to excessive resistance to output member rotation.

19 Claims, 7 Drawing Figures

INTERMITTENT ROTATIONAL DRIVE

FIELD OF THE INVENTION

This invention relates to a transmission mechanism for causing a steadily rotating driving member to impart intermittent rotation to a driven member in accordance with an operating cycle that is synchronized with rotation of the driving member; and the invention is more particularly concerned with a transmission mechanism whereby a driven rotatable member is clutched to a driving member during one predetermined portion of an operating cycle and is confined against rotation during substantially the remainder of the operating cycle.

BACKGROUND OF THE PRIOR ART

A typical application for a transmission mechanism of the type to which this invention relates is in a bag making machine or a similar machine wherein a web passes through the nip of a pair of feed rollers that rotate intermittently. In the case of a bag making machine the web is usually tubular but flattened, and during each period of rotation of the feed rollers is advanced towards a station at which its opposite walls are sealed to one another across its width and at which it is cut through to form an individual bag. Sealing and severing occur during the pauses between web advances. Each advance of the web carries it through a distance equal to the length of a single bag, and bag length is thus controlled by control of feed roller rotation.

The power source for the feed rollers comprises a steadily rotating driving shaft. The feed rollers are intermittently connected with that shaft by means of a clutch-brake mechanism that is actuated in synchronism with rotation of the driving shaft in a recurrent operating cycle.

In the usual bag making machine arrangement, the driving shaft drives an input member through a crank and pitman connection whereby the input member is rotated in one direction during one half of each driving shaft revolution and is rotated in the opposite direction during the remainder of the operating cycle. The feed rollers are drivingly connected with an output member that is clutched to the input member while the input member rotates in one direction and is declutched and braked during opposite rotation of the input member. Because input member acceleration and deceleration in each direction can be plotted as a simple harmonic motion, the output member can be clutched to the input member and declutched from it at the instants when the input member goes through zero speed during reversal of its direction of rotation, and the feed rollers are accelerated and decelerated smoothly during each period of their rotation.

It will be apparent that for precisely uniform increments of web advance, a clutch-brake mechanism of the character described must have very fast and precisely timed actuation whereby the clutch elements will be engaged and disengaged during the infinitesimal time interval of zero speed of the input member. It will also be apparent that the clutch elements must be engaged under substantial axial biasing force, to enable them to transmit the high torque needed for acceleration and deceleration of the feed roller masses. To meet these requirements, clutch-brake mechanisms for bag making machines have heretofore had relatively powerful electromagnetic or pneumatic actuators for effecting the axial shifting needed for engagement and disengagement of the clutch elements and braking elements. Electromagnetic clutch brake mechanisms were commonly used. A typical mechanism of that type is dislosed in U.S. Pat. No. 2,997,889, to Schjeldahl et al.

A prior electromagnetic actuator had the known disadvantage that there was an inherent delay in its response to inputs that commanded shifting from the braking mode to the clutching mode and vice versa. In the case of shift from the braking mode to the clutching mode, the clutch elements could be engaged with reasonable promptness by overexcitation of the electromagnet that actuated them, but due to slow decay in the magnetic field of the other electromagnet, the brake tended to remain engaged as the clutch elements began to rotate. A similar torque overlap, occurring in the shift from clutching to braking mode, could cause a slight rearward rotation of the feed rollers. Such torque overlaps were inevitably accompanied by some slippage between engaged clutch elements and braking elements, all of which elements were friction plates. Adjustments could be made, to compensate for inherent response delays and for most of the slippage, but there were both short term and long term variations in slippage. The heating of the friction plates that resulted from slippage reduced their torque transmitting capability and increased their slippage. Of course any wear on the friction plates also tended to cause slippage. The end result was a need for frequent and relatively costly adjustment and service on prior bag making machines having clutch-brake mechanisms.

It is well known that there is normally no slippage in a clutch wherein each clutch element has circumferentially spaced teeth that project axially towards the other clutch element and interfit between its teeth. Such toothed clutch elements, like friction plate clutch elements, must be engaged under substantial bias in order to transmit a significant amount of torque. However, unlike friction plates, they have to be brought together rather gently because if they meet under high impacting force when their teeth are in or near peak-to-peak relationship, they will damage one another. The actuators of prior clutch brake mechanisms, designed to engage the clutch elements rapidly and maintain them engaged under high force, were not well suited for cooperation with toothed clutch elements.

There are prior disclosures of clutch mechanisms having toothed clutch elements that are actuated to and from engagement by a cam actuated shifting lever. See, for example, U.S. Pat. No. 919,006 to Hancock and U.S. Pat. No. 1,476,766 to Reynolds. In each of these the cam has an impositive driving connection with the shifting lever such that the cam, by itself, cannot compel the shifting lever to move to both clutching and braking positions. In a clutch-brake mechanism, both clutch element engagement and brake element engagement must be positively controlled and precisely timed.

In theory it might appear simple and obvious to employ a cam for axially shifting an output member of a clutch-brake mechanism to defined clutching and braking positions, but with toothed clutch elements it is also necessary to provide for some yieldability in the actuating mechanism, to accommodate a possible meeting of the clutch elements with their teeth in peak-to-peak relationship, while nevertheless establishing the axially shifted clutch element accurately in its engaged position at precisely the right time in the cycle. A further complication is the need for preventing the interengaged teeth on the clutch elements from camming each other apart under normal torque forces. While a cam actuator could, in theory, rigidly confine an axially shiftable clutch element in a precise clutch-engaged position, so that no axial bias upon it would be needed, such confinement to a very precise position is out of the question for practical reasons, and the engaged clutch elements should instead be confined against separation by an axial biasing force acting on one of them to urge it towards the other.

Heretofore there has been no obvious solution to the complex problem of preventing slippage between clutch elements and achieving precise timing of their engagement. The best that could be done was to employ a powerful electromagnetic or penumatic actuator that slammed friction plate clutch elements into engagement under brute force. Frequent and costly maintenance were accepted as inevitable. Although a clutch-brake mechanism for a bag making machine or the like should move the web through an accurate distance at each advance, there should be provision for adjustingly rotating the feed rollers relative to the clutch-brake mechanism, to enable proper positioning of an imprinted web relative to the bag forming station, so that imprinted material will appear in a desired position on every bag produced. None of the above mentioned patents discloses means for accomplishing such adjustment.

SUMMARY OF THE INVENTION

The general object of this invention is to provide a simple, inexpensive very accurate and very reliable clutch-brake mechanism whereby an output member can be rotated in one direction during a predetermined portion of an operating cycle that is synchronized with rotation of a continuously rotatable driving shaft from which the output member is driven, and whereby the output member can be confined against rotation during substantially all of the remainder of that cycle.

More specifically it is a general object of this invention to provide a clutch-brake mechanism of the character described that does not require the frequent costly and annoying adjustments needed by prior clutch-brake mechanisms because both clutching and braking occur substantially without slippage and both braking of the output member and its clutching to the driving shaft are mechanically controlled by a cam which rotates in synchronism with the driving shaft and which therefore ensures precise timing of engagement of the braking elements and the clutch elements.

Another specific object of the invention is to provide a transmission through which the feed rollers of a bag making machine or the like can be intermittently driven from a constantly rotating driving shaft in accurately timed relation to rotation of the driving shaft, with smooth acceleration and deceleration of the feed rollers during each period of their rotation, and with provision for quickly stopping intermittent drive of the feed rollers while the driving shaft continues to rotate, such stopping being effected either manually or by automatic means responsive to an excessive force retarding rotation of the feed rollers.

It is also a specific object of this invention to provide a transmission mechanism of the character described whereby feed rollers are rotated in one direction during a predetermined portion of a cycle of drive shaft rotation, for advancing a web through a predetermined distance, and are braked during substantially the entire remainder of the cycle, having means for adjustingly rotating the feed rollers relative to the driving shaft for accurately positioning the web in relation to a station to which the feed rollers advance the web.

It is also an object of the invention to provide an intermittent drive transmission of the character described wherein all moving parts including clutching and braking elements can operate in an oil bath.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

Figure 1:
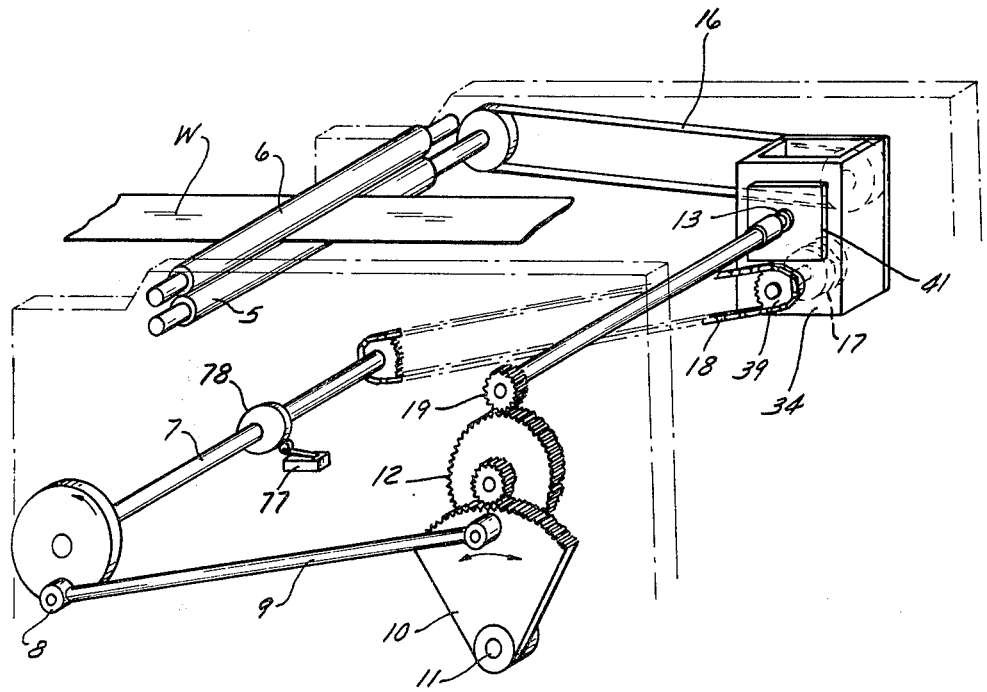
FIG. 1 is a diagrammatic perspective view of the drive mechanism for the feed rollers of a bag making machine, comprising a clutch-brake mechanism embodying the principles of this invention.

In a generally conventional bag making machine, a web W—which may be a folded sheet or a flattened tube—passes between a pair of intermittently rotated feed rollers 5, 6 whereby the web is stepwise advanced towards a bag forming station (not shown) at which the web is, in a known manner, sealed and severed across its width to form a bag. During each period of their rotation the feed rollers advance the web through a distance equal to the length of a finished bag. When they are not rotating, the feed rollers are braked so that they cannot be rotated by web tension or other forces. The machine thus has a defined operating cycle, and in the usual case the feed rollers 5, 6 are rotated during one half of each operating cycle and are braked during substantially all of the remainder of the cycle. Sealing and severing take place during the portion of each cycle in which the feed rollers are braked.

Rotation is imparted to the feed rollers 5, 6 from a continuously rotatable driving shaft 7 to which the operating cycle is synchronized as explained hereinafter. An eccentric crank 8 that is constrained to rotate with the driving shaft 7 is connected by means of a pitman 9 with a sector gear 10, so that the rotation of the driving shaft 7 rocks or swings the sector gear 10 about its fixed shaft 11. An intermediate pinion 12 meshes with the sector gear 10 and with an input member 13 to rotate the latter first in one direction and then in the other, in accordance with the direction of rocking motion of the sector gear 10. Hence, the input member 13 rotates in one direction during one half of each revolution of the driving shaft 7 and rotates in the opposite direction during the remainder of each driving shaft revolution.

Rotatable concentrically with the input member 13 is an output member 14 which is axially slidable on an output shaft 15 and has a splined connection with it. As explained hereinafter, the output member 14 is clutch-connected to the input member 13 while the latter rotates in one direction, whereas during opposite rotation of the input member 13 the output member 14 is uncoupled from it and braked. The output shaft 15 to which the output member 14 is splined is connected with the feed rollers 5, 6 by means of a chain or a cog belt 16 whereby the feed rollers are constrained to partake of all rotation of the output member 14 and are braked when it is braked. For adjustment of the distance through which the feed rollers 5, 6 advance the web during each interval of their rotation, the radius of the eccentric crank 8 can be adjustable in a conventional manner.

The alternate clutching and braking of the output member 14 is effected under the control of a cam 17 that is constrained to rotate in synchronism with the driving shaft 7 (preferably in a 1:1 ratio) as by means of gears or a timing chain 18. The cam 17 effects a purely mechanical timing of the operating cycle, with no inherent delays such as occur with pneumatic, hydraulic and electromagnetic mechanisms.

Figure 2:
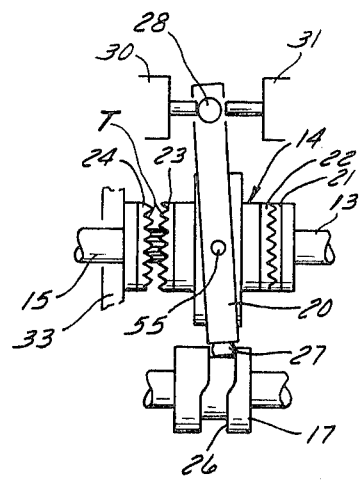
FIG. 2 is a more or less diagrammatic plan view of the clutch-brake mechanism of this invention in the part of its operating cycle wherein the output member is constrained to rotate with the input member.
Figure 3:
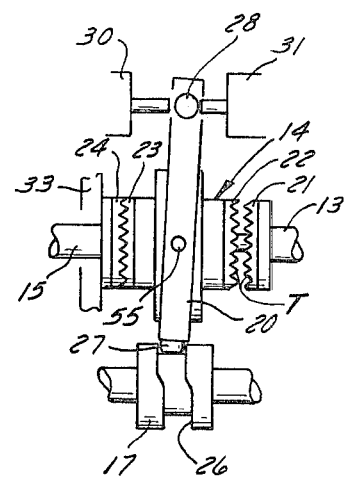
FIG. 3 is a view generally similar to FIG. 2 but showing the clutch-brake mechanism in the part of its operating cycle wherein the output member is confined against rotation.

Turning now to a general consideration of the clutch-brake mechanism itself, as somewhat diagrammatically illustrated in FIGS. 2 and 3, it comprises the input member 13, the output member 14 which is coaxial with the input member and in end-to-end relationship to it, the cam 17 which is spaced from the coaxial members 13 and 14 and rotates about an axis parallel to theirs, and an actuating lever 20 which provides a connection between the cam 17 and the output member 14.

The input member 13 comprises a short shaft that is confined to rotation and has at its outer end a driven pinion 19 that meshes with the intermediate pinion 12 for drive from the sector gear 10. At its inner end, which is adjacent to the output member 14, the input member 13 has a coaxial driving clutch element 21 with circumferentially spaced peak-like teeth T that project axially towards the output member 14. The axially shiftable output member 14 has a mating driven clutch element 22 on its end adjacent the input member 13, with corresponding axially projecting circumferentially spaced teeth T. When the output member 14 is in its axial position shown in FIG. 2, wherein the teeth T of the clutch elements 21 and 22 are meshingly engaged, the output member 14 is of course constrained to rotate with the input member 13. Coaxially secured to the opposite end of the output member 14 is a braking element 23 which can be identical to the driven clutch element 22, but with peak-like teeth T projecting in the opposite axial direction; and this braking element 23 cooperates with a relatively stationary braking element 24 that is mounted as explained hereinafter. When the output member 14 is in its axial position shown in FIG. 3, the clutch elements 21, 22 are spaced apart and the braking elements 23 and 24 are engaged to confine the output member against rotation and thus brake the feed rollers 5, 6. Obviously, the braking elements 23, 24 are spaced apart when the output member 14 is in its clutched axial position shown in FIG. 2.

The cam 17 that controls the axial position of the output member 14 is preferably a barrel cam, having a cylindrical body around which there is a circumferential groove 26 that has two portions 26a, 26b in axially offset relation to one another. The actuating lever 20 has a cam follower portion 27 that is engaged in the cam groove 26 so that rotation of the cam 17 swings the lever 20 about a fulcrum 28. In this case follower portion 27 of the lever 20 is at one of its ends (the lower end, as shown), the fulcrum 28 is at its opposite end, and intermediate its ends the lever has a connection with the output member 14 whereby the latter is axially positioned in accordance with the rotational position of the cam 17. As shown and as preferred, the lever 20 is of the second class, but it could be connected, in appropriate cases, as a first class or third class lever. The axis of the fulcrum 28 will in any case be transverse to the axis of the cam 17 and also to the coinciding axes of the input and output members 13 and 14, respectively.

Figure 4:
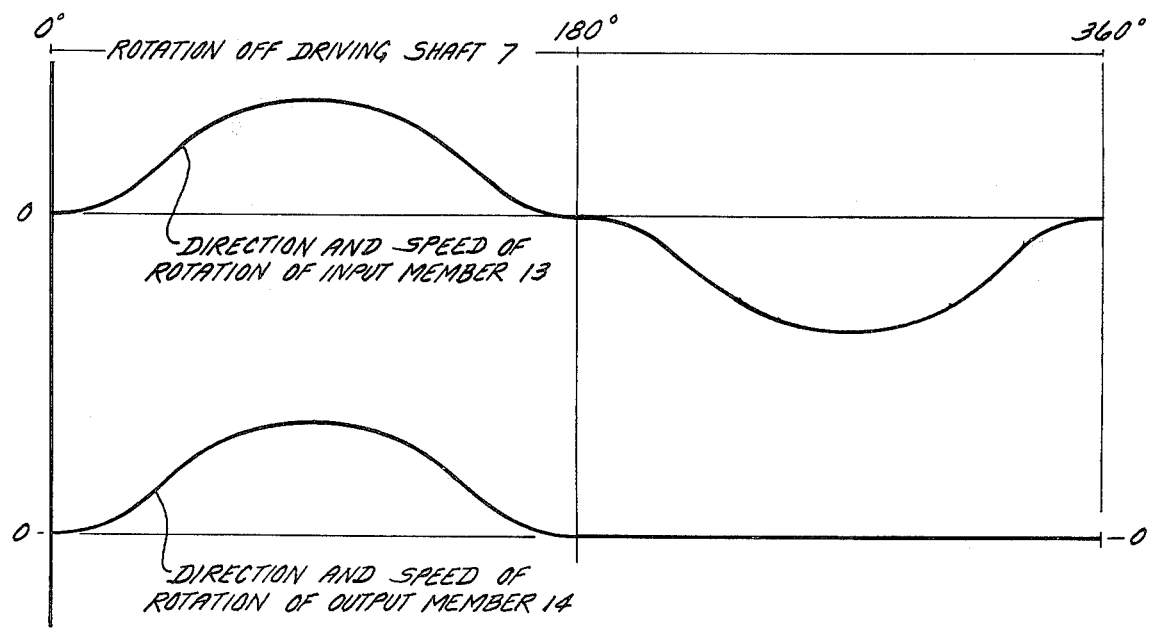
FIG. 4 is a graph illustrating changes in the speed and direction of rotation of the input and output members during the course of an operating cycle.

In the usual case, the two axially offset portions 26a, 26b of the cam groove 26 are of equal length (as measured circumferentially), and the position of rotation of the cam 17 is so synchronized with that of the eccentric 8 on the drive shaft 7 that the output member 14 is always shifted from one to the other of its positions just as the input member 13 is going through zero rotational speed in the course of reversal of its direction of rotation. FIG. 4 shows the speed and direction of rotation of the input member 13 and the output member 14, relative to one another and to the driving shaft 7, through one operating cycle. It will be seen that engagement between toothed clutch elements 21, 22 (which normally occurs at 0° in the cycle) and between toothed brake elements 23, 24 (which normally occurs at 180° in the cycle) takes place when both of the engaging elements are substantially at a stop, and that the output member 14 is smoothly accelerated and decelerated during each period of its rotation.

It has been found that some relative rotation between engaging toothed elements 21, 22 and 23, 24 can be permitted, owing to a novel feature described hereinafter, and therefore the cam groove portions 26, 26b can have unequal lengths for special situations. For example, where more sealing time is needed in plastic bag production, the cam 17 can be configured to effect clutching about 10° (of driving shaft rotation) after the input member 13 begins to rotate in one direction and to effect braking about 10° before it stops rotating in that direction, for drive during 160° of driving shaft rotation and braking during the remaining 200°. If it is desired to have the period of advance longer than the period of braking, the oscillatory driving connection 8, 9, 10 between the driving shaft 7 and the input member 13 can be modified in a suitable manner, and the cam groove 26 can be reconfigured so that the instants of clutching and braking engagements occur at zero rotational speed of the input member 13.

An important feature of the clutch-brake device of this invention is that the fulcrum 28 of the actuating lever 20 is movable in opposite directions parallel to the axes of the cam 17 and of the input and output members 13 and 14, but the fulcrum is under the influence of opposed yielding biasing forces which act upon it in both of those directions and tend to maintain it in a medial position. Although the means for biasing the fulcrum 28 could obviously comprise a pair of springs, the preferred biasing means comprises a pair of pneumatic cylinder jacks 30, 31 that are mounted coaxially with one another. Their piston rods 30a, 31a project towards one another and confine the fulcrum 28 between their adjacent ends. For structural compactness and for functional efficiency, relatively short stroke cylinder jacks 30, 31 are desirable. With pressure air applied to the cylinder jacks, and their piston rods 30a, 31a fully extended, the distance between the inner ends of the piston rods is preferably very slightly greater than the thickness of the fulcrum 28, to ensure that the fulcrum will at no time be subjected to a biasing force from more than one of the pneumatic jacks.

If the cooperating clutch elements 21, 22 or the cooperating braking elements 23, 24 happen to be brought into engagement with their teeth T in apex-to-apex relationship, the yieldable mounting of the fulcrum 28 permits the toothed elements to ease into mating engagement with one another upon the occurrence of any slight relative rotation between them, thus preventing their toothed faces from sustaining the high forces that would be imposed by the cam 17 swinging the lever 20 about a rigidly fixed fulcrum. Furthermore, the axial offset between the positions 26a and 26b of the cam groove 26 is such as to provide for a certain amount of overtravel of the lever 20; that is, the lever 20 continues to swing even after cooperating toothed elements 21, 22 or 23, 24 are fully engaged. During this overtravel portion of the lower swing, the lever 20 pivots about its connection with the output member 14, shifting the fulcrum 28 out of its medial position and thus forcing one of the jack cylinder piston rods 30a, 31a to retract against the pneumatic bias upon it. In the clutched condition illustrated in FIG. 2, the overtravel of the lever 20 causes partial retraction of the piston rod 30a with the result that the clutch elements 21, 22 are engaged under pneumatically produced axial biasing force, and in the braking situation illustrated in FIG. 3, the piston rod 31a is similarly forced into partial retraction and the braking elements 23, 24 are engaged under axial bias. It will be apparent that the medial position of the fulcrum 28 is one that it normally occupies only transiently, during shifting of the output member 14 from each of its operating positions to the other. The operating positions of the fulcrum 28 are the clutch engaging position shown in FIG. 2, in which the piston rod 30a is partially retracted, and the brake engaging position shown in FIG. 3 in which the piston rod 31a is partially retracted.

The biasing force exerted upon engaged elements 21, 22 and 23, 24 by the respective jacks 30, 31 can be a substantially high one, to accommodate transmission of high torque, but the elements are nevertheless brought gently into engagement so that they are not damaged if their teeth are not in perfect meshing relationship. Furthermore, during the brief time when clutch elements 21, 22 or brake elements 23, 24 are moving towards engagement, and until they are fully engaged, the fulcrum 28 occupies its medial position defined by the extended piston rods 30a, 31a, and therefore timing of such engagement is precise and consistent.

Figure 5:
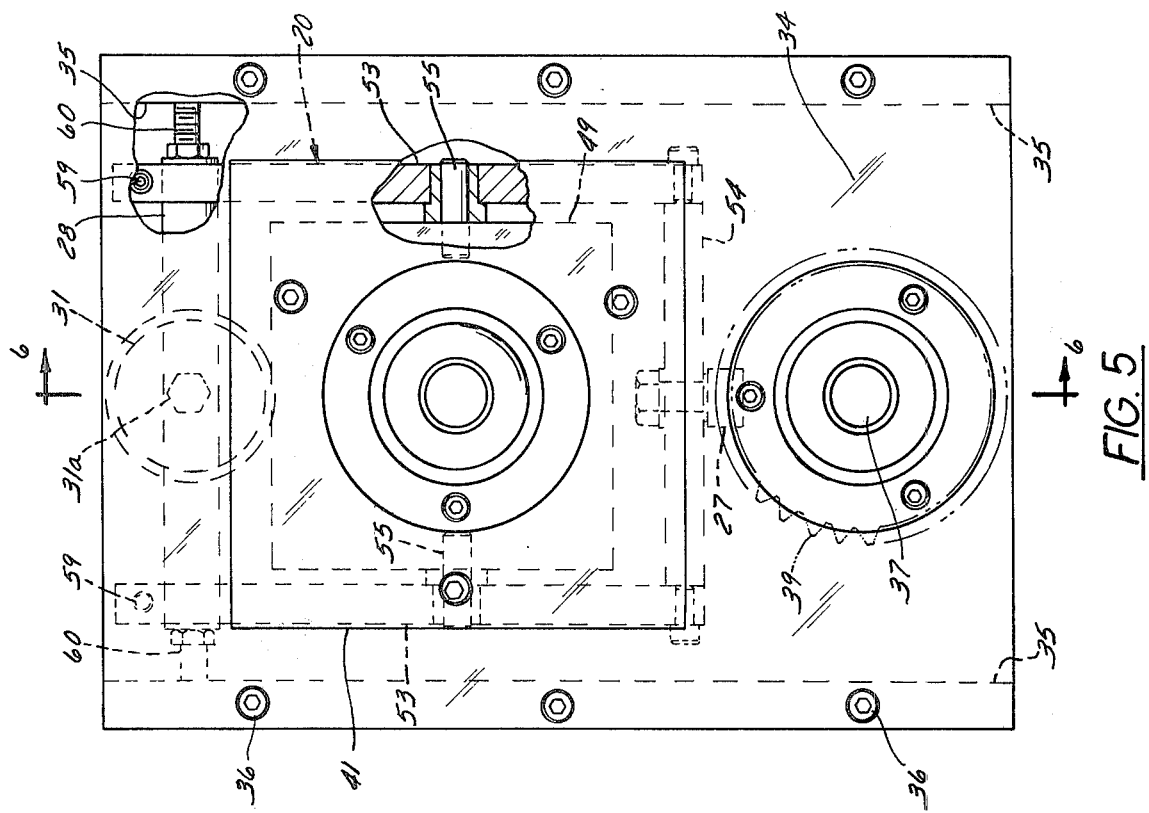
FIG. 5 is a view of the clutch-brake mechanism, mainly in side elevation but with portions broken away.

Turning now to FIGS. 4 and 5 for a more detailed consideration of the clutch-brake mechanism, it comprises stationary structure that can take the form of parallel side plates 33, 34 between which there are end plates 35 to which the side plates are connected by bolts 36. The plates 33, 34, 35 can comprise the walls of a sealed chamber that is filled with oil in which the moving parts of the clutch-brake mechanism are immersed for lubrication. The cam 17 has its shaft 37 journaled in bearings 38 in the side plates 33, 34, and one end portion of that shaft 37 projects beyond its adjacent side plate 34 to have a gear or sprocket 39 mounted thereon as part of a transmission that constrains the cam 17 to rotate in unison with the driving shaft 7.

As shown, a bearing 40 for the input member 13 is seated in a rigid bearing support 41 that is mounted outboard of the side plate 34. In an oil immersed mechanism, the bearing support 41 would of course have a sealed connection with the side plate 34. An enlarged diameter inner end portion of the input member 13, comprising the driving clutch element 21, is received in hole 42 in the side plate 34. In the opposite side plate 33 is seated a bearing 43 for the output shaft 15 on which the output member 14 is axially slidable. To connect the input member 13 and the output shaft 15 for mutual support and for relative rotation, the input member 13 has at its inner end a concentric inwardly opening well, lined with a bushing 44 that provides a bearing for a concentric reduced diameter pilot portion 45 on the inner end of the output shaft 15. The input member 13 and the output shaft 15 are confined by their respective bearings 40 and 43 against outward motion, and they mutually confine one another against axially inward displacement.

The output member 14 comprises a cylindrical collar-like body that has a splined connection 46 with the output shaft 15 to be axially slidable relative to it between the side plates 33, 34. Around its middle the output member 14 has a circumferential radially outwardly opening groove in which a bearing ring 47 is seated. To provide for installation of this bearing ring 47, the output member body is formed in two identical axially separable parts 14a, 14b that are connected by through bolts 48. As shown, the driven clutch element 22 and the rotatable braking element 23 are formed as separate parts that are bolted to opposite ends of the output member body, but each of these elements could of course be formed in one piece with one of the body parts 14a, 14b.

Around the outer race of the bearing ring 47, which can rotate freely about the output member 14, is clamped a collar 49 that comprises a part of the connection between the lever 20 and the output member. In this case the collar 49 is square in outline, with a slit 50 opening from its central hole to one side edge, so that it can be radially contracted around the bearing ring by a clamping bolt 51.

Figure 6:
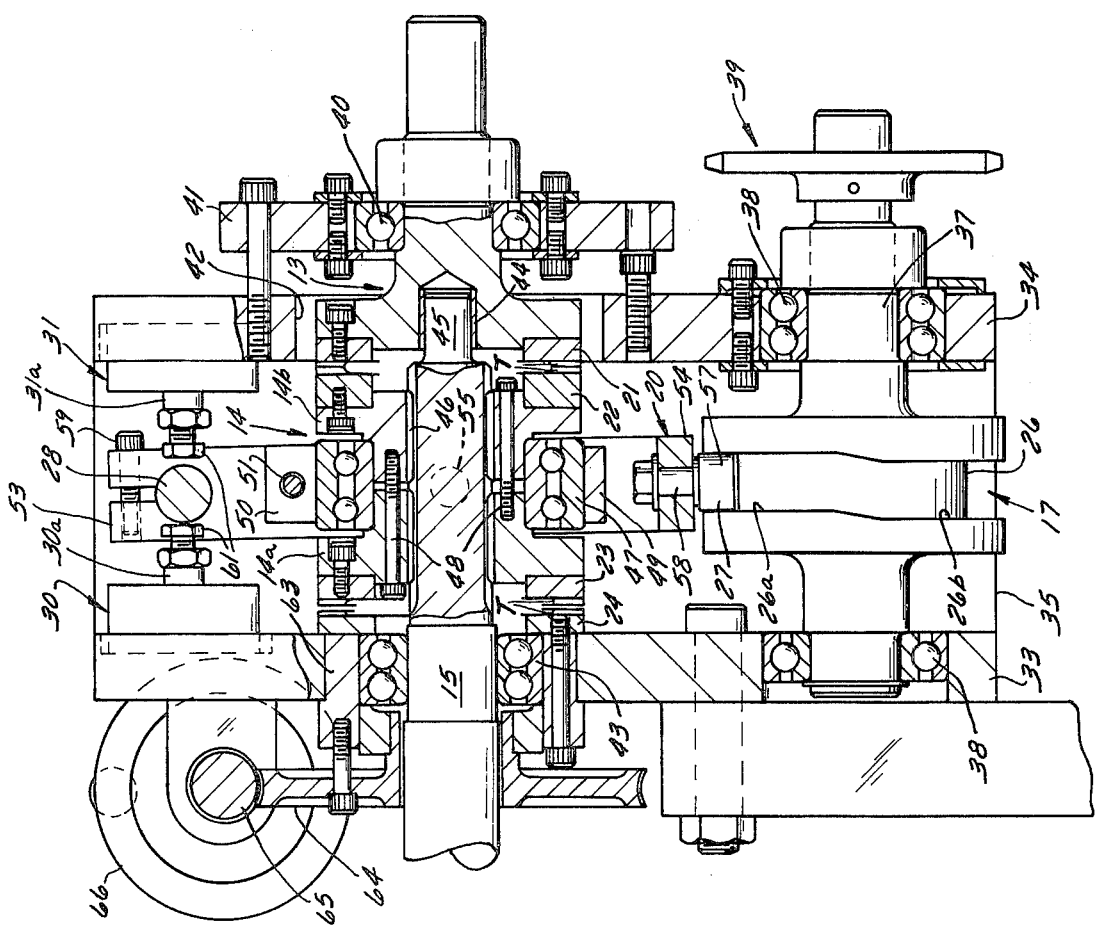
FIG. 6 is a view in section, taken substantially on the plane of the line 6—6 in FIG. 5.

The actuating lever 20, as viewed transversely to its fulcrum axis (FIG. 6), is yoke-like and in the form of a rectangular frame, having a pair of upright side members 53 that are spaced to opposite sides of the output member 14, a transversely extending bottom member 54 that is below the output member 14 and above the cam 17, and a rod-like transverse top member that comprises the fulcrum 28. Projecting inwardly from the side members 53, intermediate the top and bottom ends thereof, are a pair of coaxial pins 55 which are received in oppositely outwardly opening coaxial wells in the collar 49, to provide a trunnion connection between the lever 20 and the output member 14. The axis of the pins 55 transversely intersects the output member axis. Since the collar 49 is secured to the bearing ring 47 that surrounds the output member 14, the output member, in a sense, supports the lever 20 and rotates within the rectangular frame-like structure of the lever.

The cam follower portion 27 of the lever 20 comprises a roller 57 that is rotatable on a downwardly projecting shoulder bolt 58 secured to the bottom member 54 of the lever, intermediate the ends thereof. The roller 57 has a diameter to be received in the cam groove 26 with an easy fit between its side surfaces.

Each side member 53 of the lever is split at its upper end to be clamped to the fulcrum rod 28 by means of a clamping bolt 59. Threaded coaxially into each end of the fulcrum rod 28 is an abutment bolt 60 which contacts the adjacent end plate 35 of the fixed structure and confines the frame-like lever 20 against swinging about the axis of the output member 14.

The axially short cylinders of the pneumatic jacks 30, 31 are seated in shallow inwardly opening wells in the side plates 33, 34. The piston rods 30a, 31a are coaxial with one another and engage the fulcrum rod 28 midway between its ends. To avoid the need for shimming the cylinders, the inner end of each piston rod 30a, 31a has an abutment screw 61 coaxially threaded into it, securable in any position of its axial adjustment by means of a lock nut. As already pointed out, these screws 61 are so adjusted that one or the other of the piston rods 30a, 31a is always fully extended and both are fully extended when the fulcrum 28 is in its medial position.

The relatively stationary braking element 24 is on the inner end of a tubular bushing or bearing housing 63 within which the bearing 43 for the output shaft 15 is confined and which is itself rotatable in the side plate 33. On the outer end of the rotatable bearing housing 63 is a concentric worm wheel 64 that meshes with a worm 65. By means of a handwheel 66 on the shaft of the worm 65, or by means of a remotely controllable servo motor (not shown) or the like, the worm 65 can be rotated for adjusting rotation of the tubular member 63 and hence of the relatively stationary braking element 24. It will be apparent that the worm 65 will normally prevent rotation of the worm wheel 64, thus locking the stationary braking element 24 against rotation. However, with the output member 14 in its axial position in which the braking elements 23, 24 are engaged, rotation of the worm 65 effects adjusting rotation of the feed rollers 5, 6 relative to the driving shaft 7 and the cam 17, so that a web advanced by the feed rollers 5, 6 will always stop with imprinted matter thereon in a proper position relative to each bag to be formed from the web. The adjustment mechanism comprising the worm 65 and worm wheel 64 is also useful for initially threading a web through the feed rollers 5, 6.

In the event the feed rollers 5, 6 are prevented from rotating, as when a foreign body is accidentally engaged between them, the torque applied to the driving clutch element 21 will be translated by the engaged surfaces of the peak-like teeth T of the two clutch elements 21, 22 into an axial force upon the output member 14 in the direction away from its clutching position. As a result, the lever 20 will be swung about its cam follower portion 27, so that (as will be evident from FIG. 2), the flucrum 28 will be shifted to the left of its clutch engaging position, causing a further retraction of piston rod 30a against its pneumatic bias. A sensor 68 (see FIG. 7) can be arranged to detect such displacement of the fulcrum 28 and to produce an output that releases pneumatic pressure in the cylinder jack 30, permitting the fulcrumed end of the lever 20 to swing all the way to the left under the influence of a spring 72, so that the output member 14 is maintained in its braking position in all rotational positions of the cam 17.

Figure 7:
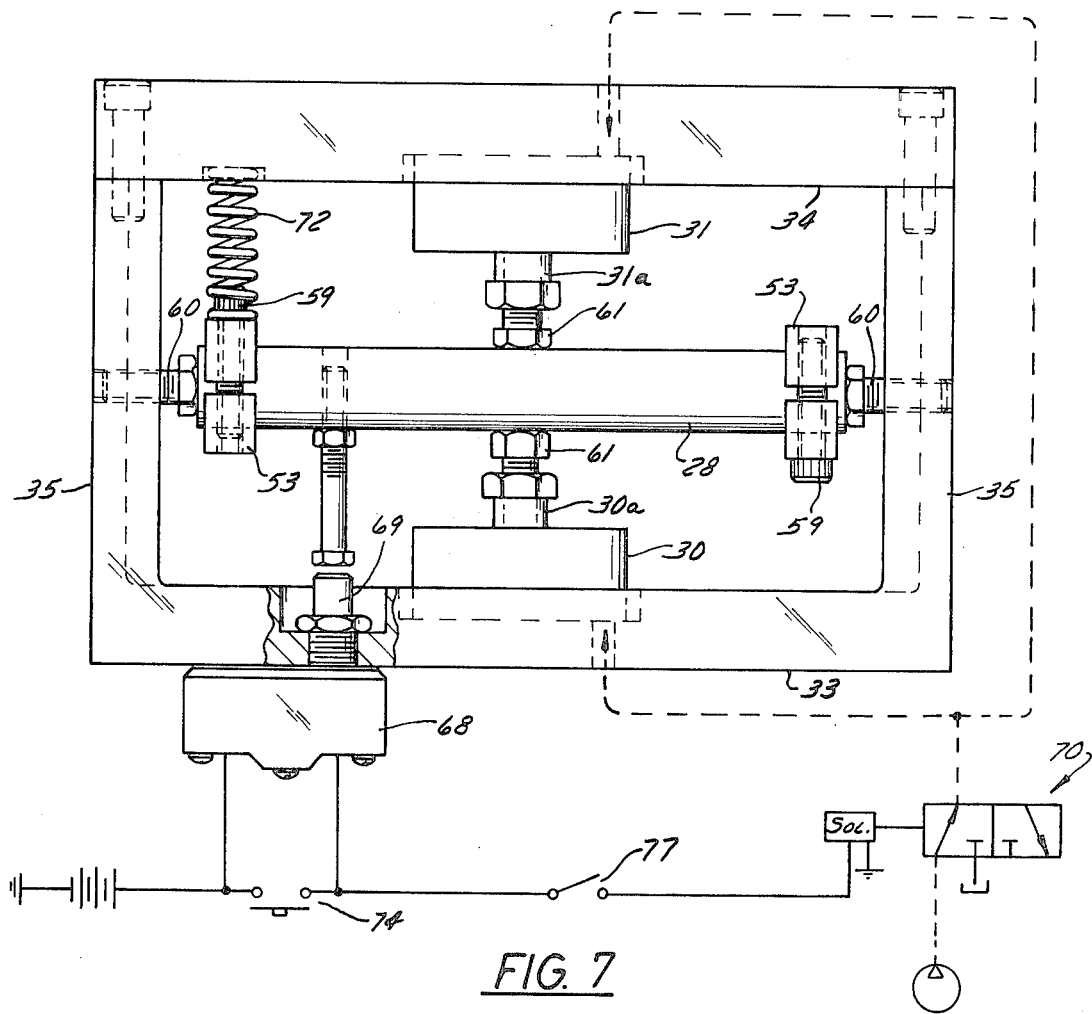
FIG. 7 is a top view on an enlarged scale of the clutch-brake mechanism shown in FIGS. 5 and 6, modified to incorporate means for automatically declutching the feed rollers when an excessive torque is needed for rotating them.

As shown in FIG. 7, the sensor 68 can comprise a microswitch having a plunger-like actuator 69 that extends parallel to the piston rods 30a, 31a and bears against the fulcrum 28 between one of its ends and its middle zone at which the piston rods engage it. As illustrated, the microswitch 68 is mounted at the same side of the fulcrum 28 as the pneumatic jack 30. When the fulcrum 28 is in its normal range of positions, to and including its brake engaging (FIG. 3) and its clutch engaging (FIG. 2) positions, the plunger 69 of the microswitch 68 remains extended, to maintain the microswitch in one of its two conditions, e.g., open. When torque applied to the input member 13 is greater than can be transmitted by the clutch elements 21, 22, and the fulcrum 28 is thereby shifted beyond its clutch engaging position, further retracting piston rod 30a, such shifting of the fulcrum effects retraction of the microswitch plunger 69 so that the microswitch 68 is actuated to its opposite (e.g., closed) condition. The microswitch 68 is connected in the energizing circuit for the solenoid of an electro-magnetic air valve 70, and change of condition of the microswitch opens that air valve to release pneumatic pressure at the cylinder jack 30. For simplicity the valve 70 relieves pressure air at both cylinder jacks 30, 31, whereupon the position of the fulcrum is controlled solely by the spring 72, which reacts between the fulcrum and the side plate 34.

The spring 72 exerts a substantially smaller biasing force than the pneumatic jacks. It is needed for biasing the fulcrum 28 beyond its brake engaging position because the piston rod 31a is fully extended when the fulcrum is in its transiently-occupied medial position and is out of engagement with the fulcrum when the fulcrum is in its clutch engaging position.

To prevent the air valve 70 from being opened in response to tooth-to-tooth engagement of the clutch elements 21, 22, the sensor 68 is connected in series with a logic switch 77 that senses the position of rotation of the driving shaft 7 and, in effect, permits opening of the air valve 70 only after the driving shaft is a few degrees past its 0° position and until it is within a few degrees of its 180° position (see FIG. 4). The condition of the logic switch 77 can be controlled, for example, by means of an actuating cam 78 on the driving shaft 7, as schematically shown in FIG. 1. The logic switch 77 is preferably connected in a logic circuit which allows pressure air to be restored to the pneumatic jack 30 only during the braking phase of a cycle, to prevent clutch engagement in the midst of a clutched phase.

It will be apparent that the air valve 70 could be controlled by a manually actuated switch 74, connected in parallel with the sensor switch 68 or replacing it and mounted at any readily accessible location. With such a manually operable switch, web feed could be temporarily halted at any time, as for removal of accumulated bags from the forming station, without the need for stopping the driving shaft 7.

When rotation of the driving shaft 7 is stopped and started, it is desirable for the clutch-brake mechanism to be in its braking mode all through shutdown and start-up, so that the web is neither stopped nor started during the course of an advance. To this end the energizing circuitry for the motor (not shown) that drives the driving shaft 7 can incorporate a sequencing switch or relay, analogous in function to the switch 74 but connected in an energizing control circuit whereby operation of the air valve 70 is properly synchronized with the operating cycle, so that, for shut-down, air pressure in the jack 30 is relieved during the braking phase of an operating cycle before the driving shaft is allowed to decelerate substantially and during start-up air pressure is restored only at a time when the driving shaft 7 (or the cam 17) is in the braking phase of a cycle.

From the foregoing description taken with the accompanying drawings it will be apparent that this invention provides an intermittent drive transmission, particularly suitable for bag machines and the like, whereby an output member is rotatably driven from a constantly rotating driving shaft during a predetermined portion of an operating cycle synchronized with driving shaft rotation and is braked through substantially all of the remainder of the operating cycle. It will also be apparent that the invention provides a simple, inexpensive and trouble-free clutch-brake mechanism for apparatus of the character described, whereby accurate timing is maintained throughout every cycle without the need for adjustments because there are no slippages or inherent delays. As will be further apparent, the clutch-brake mechanism of this invention is capable of trnsmitting high torque from the input member to the output member and can incorporate simple provisions for emergency braking of the output member and for readily adjusting the rotational position of the output member relative to that of the driving shaft.

We claim:

1. An intermittent drive transmission comprising a continuously rotatable cam that defines an operating cycle by each of its revolutions, an input member which rotates in synchronism with said cam through substantially the whole of said cycle and on which there is a concentric driving clutch element, a rotatable output member concentric with said input member and shiftable axially in opposite directions between a driving position in which a concentric driven clutch element at one axial end of the output member is engaged with said driving clutch element and a stopping position in which said clutch elements are spaced apart, and an elongated lever having at lengthwise spaced portions thereof a fulcrum, a connection with said output member, and a cam follower portion which is constrained by said cam, during an operating cycle, to move substantially in said directions to and from each of a pair of defined limits, said transmission being characterized by:
   A. a rotatable braking element on the opposite axial end of said output member;
   B. a relatively stationary braking element engaged by said rotatable braking element when the output member is in its stopping position to confine the output member against rotation;
   C. means mounting said fulcrum for motion in said opposite directions; and
   D. yielding biasing means acting in each of said opposite directions upon said fulcrum to urge it towards a predetermined medial position.

2. The intermittent drive transmission of claim 1 wherein each of said elements has peak-like, axially projecting, circumferentially spaced teeth that interfit with the teeth on the element with which it engages, to preclude slippage between engaged elements.

3. The intermittent drive transmission of claim 2 wherein said relatively stationary braking element is adjustingly rotatable.

4. The intermittent drive transmission of claim 1 further characterized by:
   (1) said biasing means comprising a pneumatic cylinder jack which is normally charged with pressure gas and whereby said fulcrum is urged in one of said opposite directions; and
   (2) means for discharging pressure gas from said jack to relieve its biasing force upon the fulcrum and allow an opposing biasing force thereon, acting through the lever, to maintain the output member in its stopping position during the entire operating cycle.

5. The intermittent drive transmission of claim 4 wherein each of said clutch elements have peak-like axially projecting, circumferentially spaced teeth that interfit with the teeth on the other clutch element to prevent slippage between the clutch elements, and wherein said means for discharging pressure gas from said jack comprises
   (1) sensor means operative when said cam follower portion is at one of its said defined limits for producing an output in response to displacement of said fulcrum through a predetermined distance in the other of said opposite directions from its medial position, and
   (2) a valve connected with said pneumatic jack and responsive to said output from said sensor means.

6. The intermittent drive transmission of claim 1 wherein said defined limits of motion of said cam follower portion are so located that the fulcrum is out of its said medial position when the output member is in each of its said positions, so that engaged elements are maintained engaged under an axial biasing force imposed by the biasing means acting upon the fulcrum and transmitted to the output member through the lever.

7. A clutch-brake mechanism for an intermittent drive transmission, comprising a rotatable output member that is movable axially in opposite directions between braking and clutching positions, said output member having a concentric rotatable braking element which faces in one of said directions and engages an opposing relatively stationary braking element in the braking position of the output member and having a concentric driven clutch element which faces in the other of said directions, and a rotatable input member that is concentric with said output member and has a concentric driving clutch element which opposes said driven clutch element and is engaged thereby in the clutching position of the output member, said clutch-brake mechanism being characterized by:
   A. each of said elements having peak-like axially projecting, circumferentially spaced teeth that meshingly interpose themselves between the teeth on the opposing element upon engagement therewith;
   B. a lever having
      (1) a fulcrum about which the lever is swingable in said opposite directions,
      (2) a cam follower portion spaced from said fulcrum and movable in substantially said opposite directions, and
      (3) a connection with the output member that is spaced from said fulcrum and said cam follower portion and whereby the output member is normally moved to its said positions by motion of said cam follower portion;
   C. a cam rotatable in synchronism with rotation of the input member and cooperating with said cam follower portion to constrain the same to move to a defined limit in each of said directions;
   D. means mounting said fulcrum for shifting in each of said directions from a medial position; and E. opposing biasing means yieldingly resisting displacement of the fulcrum in each of said directions from said medial position.

8. The clutch-brake mechanism of claim 7 wherein said cam is a barrel cam confined to rotation about an axis which extends in said directions, having a circumferential groove with portions that are axially offset relative to one another, and wherein said cam follower portion of the lever is confined in said groove.

9. The clutch-brake mechanism of claim 7, further characterized by:

F. said cam being so arranged that engagement of opposing elements occurs before the cam follower portion of the lever reaches each of said limits during its movement towards the same, so that opposing elements are maintained engaged under axial biasing force transmitted through the lever by said biasing means.

10. In a clutch-brake mechanism whereby rotational drive is intermittently imparted to feed rollers, comprising a rotatable output member that is axially shiftable in opposite directions to and from a clutching position wherein a driven clutch element thereon is engaged with an opposing driving clutch element that is confined to rotation, actuating means comprising a cam constrained to rotate in synchronism with said driving clutch element, for shifting said output member into and out of said clutching position at predetermined times in an operating cycle defined by rotation of said cam, said actuating means further comprising:

A. a lever having
  (1) a fulcrum about which the lever is swingable in said opposite directions,
  (2) a connection with said output member that is spaced from said fulcrum and whereby swinging of the lever about said fulcrum imparts axial motion to the output member, and
  (3) a cam follower portion spaced from said fulcrum and said connection and engaged with said cam to be constrained thereby to move in said directions to each of a pair of defined limits;
B. means mounting said fulcrum for movement substantially in said directions to and from a defined position from which said fulcrum is displaced in one of said directions to a clutch engaging position when said cam follower portion is at one of its said defined limits and said clutch elements are fully engaged; and
C. biasing means acting upon said fulcrum to yieldingly urge the same in the other of said directions, towards said defined position.

11. The clutch-brake mechanism of claim 10 wherein said biasing means comprises a pneumatic cylinder jack and means for maintaining pressurized gas therein, further characterized by:

D. other biasing means urging said fulcrum in said one of said directions with a force smaller than that normally exerted by said cylinder jack; and
E. means for relieving said cylinder jack of pressurized gas, to enable the other biasing means to hold the output member out of its clutching position in all positions of said cam follower portion.

12. The clutch-brake mechanism of claim 11, further characterized by:

(1) each of said clutch elements having peak-like, circumferentially spaced teeth which project axially towards the other clutch element and which are meshingly interposed between the teeth on the other clutch element when the clutch elements are engaged, and
(2) said means for relieving the cylinder jack of pressure gas comprising
  (a) sensor means operative to produce an output when said cam follower portion is at said one of its defined limits and said fulcrum is displaced in sid one direction from its clutch engaging position, and
  (b) a normally closed valve connected with said pneumatic cylinder jack and arranged to be opened in response to said output from said sensor means.

13. In a clutch-brake mechanism whereby rotation of a rotatable drive member is intermittently imparted to feed rollers, comprising a rotatable output member that is axially shiftable in opposite directions to a clutching position wherein a driven clutch element thereon is engaged with an opposing driving clutch element on said drive member and to a braking position wherein a braking element on said output member is engaged with an opposing stationary braking element, actuating means comprising cam constrained to rotate in sychronism with said drive member, for shifting said output member to each of said positions at a predetermined time in an operating cycle defined by rotation of said cam, and whereby opposing elements are maintained engaged under axial biasing force, said actuating means further comprising:

A. a lever having
  (1) a fulcrum about which the lever is swingable in said directions,
  (2) a connection with said output member that is spaced from said fulcrum and whereby swinging motion of the lever about said fulcrum imparts axial motion to the output member, and
  (3) a cam follower portion spaced from said fulcrum and said connection and engaged with said cam to be constrained thereby to move substantially in said directions to each of a pair of defined limits;
B. means mounting said fulcrum for movement substantially in each of said directions from a defined position from which the fulcrum is displaced in one of said directions when said cam follower portion is at one of its said limits and said clutch elements are engaged and from which the fulcrum is displaced in the other of said directions when said cam follower portion is at the other of its said limits and the braking elements are engaged; and
C. opposing biasing means urging said fulcrum in each of said directions to yieldingly oppose its displacement out of said defined position.

14. The clutch-brake mechanism of claim 13, wherein said braking elements have interfitting teeth, further characterized by:

D. said stationary braking element being adjustably rotatable.

15. The intermittent drive transmission of claim 2, further characterized by:

E. means mounting said relatively stationary braking element for rotation;
F. a worm wheel mounted concentrically with said relatively stationary braking element and constrained to rotation therewith; and
G. a worm confined to rotation about an axis transverse to that of said worm wheel and meshingly engaged with said worm wheel to normally confine the same against rotation but by rotation of which the worm wheel, and thus said relatively stationary braking element, is adjustably rotated.

16. The clutch brake mechanism of claim 7, further characterized by:
F. means mounting said relatively stationary braking element for adjusting rotation but normally confining it against rotation.

17. An intermittent rotational drive comprising a rotatable output member that is axially shiftable in opposite directions to and from a clutching position wherein a driven clutch element thereon is engaged with an opposing driving clutch element that is confined to rotation, comprising:
A. an elongated lever having
 (1) a fulcrum about which the lever is swingable in said directions, and
 (2) a connection with said output member that is spaced along the lever from said fulcrum and whereby swinging of the lever about said fulcrum imparts axial motion to the output member;
B. means mounting said fulcrum for shifting in each of said directions to and from a defined position;
C. lever actuating means whereby a portion of said lever that is spaced along it from said fulcrum and said connection is constrained to move in said opposite directions, in synchronism with rotation of the driving clutch element, to and from a position in which the clutch elements are engaged and said fulcrum is spaced a distance in one of said directions from its said defined position;
D. releasable biasing means urging the fulcrum in the other of said directions, towards said defined position, with a substantially high biasing force;
E. means for relieving said biasing force to provide for continuing rotation of said driving clutch element without rotation of said output member; and
F. other biasing means urging the fulcrum in said one direction, away from its said defined position, with a biasing force substantially lower than said high biasing force.

18. The intermittent rotational drive of claim 17, further characterized by:
G. said clutch elements having peak-like interfitting, circumferentially spaced, axially projecting teeth that cooperate, when the clutch elements are engaged, to normally prevent rotational slippage between them but to cam said output member axially away from its clutching position when rotation of the output member is opposed by a force exceeding a predetermined value; and
H. said means for relieving the biasing force exerted by the releasable biasing means comprising a sensor which detects movement of the fulcrum through more than said distance in said one direction from its defined position.

19. An intermittent rotational drive comprising a rotatable output member that is axially shiftable in opposite directions to and from a clutching position wherein a driven clutch element thereon is engaged with an opposing driving clutch element that is confined to rotation, characterized by:
A. said clutch elements having peak-like, interfitting, circumferentially spaced, axially projecting teeth that cooperate, when the clutch elements are engaged, to normally prevent rotational slippage between them but to cam said output member axially away from its clutching position when rotation of the output member is opposed by a force exceeding a predetermined value;
B. an elongated lever having
 (1) a fulcrum about which the lever is swingable in said directions, and
 (2) a connection with said output member that is spaced along the lever from said fulcrum and whereby swinging of the lever about said fulcrum imparts axial motion to the output member;
C. means mounting said fulcrum for shifting in each of said directions to and from a defined position;
D. lever actuating means synchronized with rotation of the driving clutch element, whereby a portion of said lever that is spaced along it from said fulcrum and from said connection is constrained to move in said opposite directions, to and from a position in which the clutch elements are engaged and said fulcrum is spaced a distance in one of said directions from its said defined position;
E. pressurized biasing means urging the fulcrum in the other of said directions, towards said defined position, with a substantially high biasing force;
F. sensor means for producing an output when the fulcrum is spaced by more than said distance in said one direction from its said defined position;
G. pressure release means operatively associated with said sensor means for relieving said biasing force in response to said output from the sensor means; and
H. other biasing means urging the fulcrum in said one direction with a biasing force substantially lower than said high biasing force.

* * * * *